F. HÜSERICH.
PROCESS FOR MANUFACTURING IMITATION STAINED GLASS OUT OF PAPER.
APPLICATION FILED DEC. 16, 1909.

1,002,993.

Patented Sept. 12, 1911.

Witnesses:

Inventor:

UNITED STATES PATENT OFFICE.

FRANZ HÜSERICH, OF ELBERFELD, GERMANY.

PROCESS FOR MANUFACTURING IMITATION STAINED GLASS OUT OF PAPER.

1,002,993. Specification of Letters Patent. Patented Sept. 12, 1911.

Application filed December 16, 1909. Serial No. 533,330.

*To all whom it may concern:*

Be it known that I, FRANZ HÜSERICH, a citizen of the German Empire, residing at Elberfeld, in the Province of Rhenish Prussia and Kingdom of Prussia, Germany, have invented certain new and useful Improvements in Processes for Manufacturing Imitation Stained Glass out of Paper; and I do hereby declare the following to be a full, clear, and exact description of the invention, such as will enable others skilled in the art to which it appertains to make and use the same.

The subject-matter of the present application is a new process for manufacturing imitation stained glass out of paper, according to which process products can be obtained which are in appearance considerably more similar to glass than the ordinary imitation stained glass made out of paper. To this end I coat unevenly with transparent varnish or equivalent material a sheet of embossed paper, the covering of varnish on one side being sufficient to fill the depressions and thus present a plane surface, but the covering of varnish on the other side leaving visible the prominent parts of the paper, since it is thin enough to follow the contour of the latter.

Figure 1:
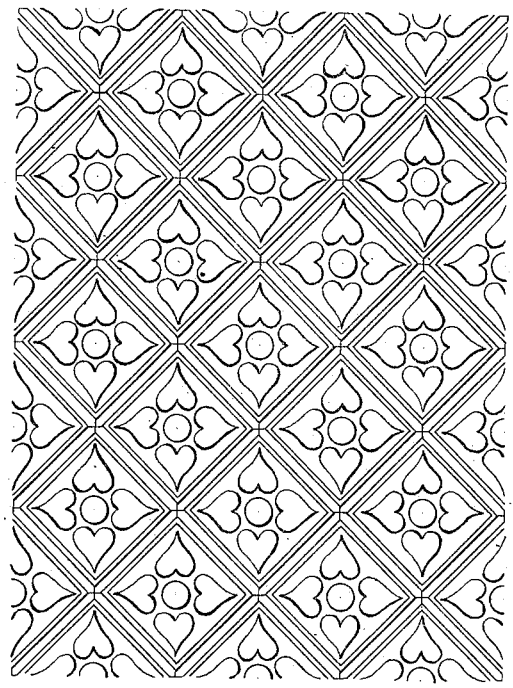
Figure 2:
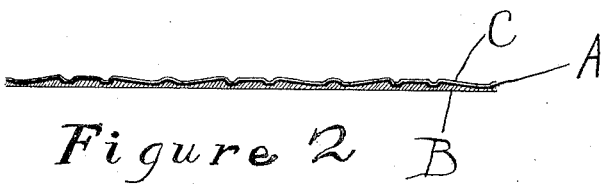

In the accompanying drawings: Figure 1 represents a plan view of a sheet of artificial glass made according to my invention; and Fig. 2 represents a cross-section of the same on line 2—2 of said Fig. 1.

A designates the sheet of embossed paper; B the thick layer of transparent varnish on one side thereof and C the thinner layer of such varnish on the other side thereof. The layer B presents a plane surface as it fills all depressions and extends across all prominences. The layer C follows the elevations and depressions of the paper, being a thin sheet of corresponding contour. Their combined effect in refraction and reflection gives a true glassy appearance, the form, design and color being supplied by the paper.

The embossing may be done by rolls or any convenient known means available for such purposes and either before or after the application of the thinner coating of varnish, the process being essentially the same notwithstanding the difference in the order of its steps. In the latter case the varnish of the side then coated should be allow to dry before the embossing action.

The imitation stained glass made according to the new process is exactly similar to glass on account of the peculiar way in which the light is refracted. The effect may be enhanced by printing on the material any pattern, picture or the like.

Besides the greater similarity of glass, the new imitation glass possesses in comparison with the well-known imitation glass, the further material advantage that it is considerably more durable on account of the thicker coating of varnish and is not as brittle as said well known kinds.

What I claim as my invention and desire to secure by Letters Patent is:

A process for manufacturing imitation stained glass consisting in embossing a sheet of paper, coating one face with a layer of transparent material thin enough to follow the contour thereof and coating the other face with a layer of transparent material thick enough to fill all the depressions in said face.

In testimony whereof, I have signed my name to this specification in the presence of two subscribing witnesses.

FRANZ HÜSERICH. [L. S.]

Witnesses:
  OTTO KÖNIG,
  CHAS. J. WRIGHT.